3,776,843
SOLID FIRE-EXTINGUISHING COMPOSITIONS
Arnold George Cottrell, Nevin Dornan Bradford, and Terence Oliver Lovett, Runcorn, England, assignors to Imperial Chemical Industries Limited, London, England
No Drawing. Filed June 14, 1971, Ser. No. 153,041
Claims priority, application Great Britain, June 25, 1970, 30,910/70
The portion of the term of the patent subsequent to Sept. 21, 1988, has been disclaimed
Int. Cl. A62d 1/00; C07c 127/00
U.S. Cl. 252—7          11 Claims

ABSTRACT OF THE DISCLOSURE

Improved yields of fire-extinguishing compounds having the empirical formula $MC_2N_2H_3O_3$ were M is an alkali metal are obtained by reacting urea with an alkali metal hydroxide, carbonate, bicarbonate or sesquicarbonate at a temperature of between 150° C. to 200° C. and in contact with an atmosphere containing at least 5% and up to 50% by volume of water vapor.

---

This invention relates to fire-extinguishing compositions and to the manufacture thereof.

Fire-extinguishing compositions made from the reaction at temperatures below 150° C. between urea and alkali metal salts have been disclosed in our patent specification No. 1,168,092 in which the novel compound $MC_2N_2H_3O_3$ was described as the important constituent. We have now found that improved yields of the novel compound are produced if the temperature is raised above 150° C. provided that sufficient water vapour surrounds the reactants to suppress undesirable side reactions.

According to the present invention there is provided a method of producing fire-extinguishing compositions comprising reacting urea with a hydroxide of, or a carbonic acid salt of, an alkali metal at a temperature of 150° C. to 200° C. and in contact with an atmosphere containing at least 5% by volume of water vapour.

The carbonic acid salt of the alkali metal is preferably either the carbonate or the bicarbonate but may also be the sesquicarbonate. The alkali metal salts preferred are those of sodium and potassium and the latter are especially preferred for their fire-extinguishing powers. The proportions of the reactants used include those more fully described in U.K. specification No. 1,168,092, though lower proportions of alkali metal carbonate (e.g. 0.33 mole per mole of urea) can be used with advantage.

The temperature of the reaction may be from 150° C. to 200° C., and is chosen to provide an optimum balance between the desirable increased speed of reaction and the undesirable increase in by-products which result from raising the temperature. Temperatures from 150° C. to 180° C. are preferred and a temperature in the range 150° C. to 165° C. is especially preferred. The desirable product in order to give compositions having effective flame-extinguishing characteristics is the compound having the empirical formula $MC_2N_2H_3O_3$ and infra-red spectral characteristic as described in our U.K. Pat. No. 1,168,092. This compound is formed in high concentration by the method of this invention.

The presence of the water vapour suppresses the formation of by-products, particularly cyanate, but when proportions in excess of about 50% by volume in the atmosphere are used some of the useful product of the reaction $MC_2N_2H_3O_3$ may be destroyed by hydrolysis. Concentrations of water vapour of from 10% by volume to 30% by volume are preferred for the optimum yield of product.

The control of the humidity of the atmosphere may be achieved by conducting the reaction in a closed vessel to which steam is admitted. The vessel may be under increased pressure or at atmospheric pressure and if desired the humidity inside the vessel may be continuously monitored for example using an optical analyser described in our U.K. Pat. 1,114,193 working in the infra-red region of the spectrum. The reactants may conveniently be spread to a depth of one or two inches, in open trays inside an oven in which the atmosphere is controlled by the admission of steam. However the reactants may be bulked and agitated, for example by stirring or tumbling, in a closed heated vessel to which steam is admitted. Alternatively a conveyor belt may convey the reacting solids through a humidity controlled oven or a rotary kiln may be a suitable vessel for at least part of the reaction.

The operation is preferably carried out in three stages:
(i) a reaction stage
(ii) a steaming stage
(iii) a drying stage.

In the reaction stage water is a product of the reaction and moisture level in the atmosphere increases gradually at first until a maximum is reached but subsequently falls as the reaction begins to slow down. The reaction stage suitably proceeds under these humidity conditions for an extra 1 to 2 hours making a total of between 2 and 3.5 hours for the reaction stage. In the steaming stage, probably lasting from 1 to 2.5 hours, the steam input is increased in order to maintain the optimum humidity of the atmosphere. This is desirable because the rate of production of water by the reaction decreases. For example, in plant conditions in which steam is added as a continuous stream the rate of steam input may conveniently be increased by about 3 kg./hour, for example from 12.75 kg./hour for stage (i) to 15.75 kg./hour for stage (ii). The total time for all stages is preferably from 4 to 5 hours.

The final drying stage is conveniently conducted by shutting off the steam and providing a flow of air, for example in a stream of dry air for about 15 minutes, when the chemical reaction has been completed and the concentration of urea has reached negligible proportions. More than 1.0% of urea in this dried fire fighting powder is undesirable because it impairs the free flowing properties of the powder. Urea is hydrolysed to ammonia during the steaming stage but if too high a concentration remains, an optional fourth stage may be introduced.

The product may be taken from the oven, cooled and then tumbled or ground in order to bring fresh surfaces into contact with the atmosphere. The product is then returned to the oven or reactor and heated again with a steam input similar to that used for the steaming stage (ii) above.

Alternatively the fourth stage may consist of a washing of the product with a suitable solvent for urea whereby excess urea is dissolved by the solvent and washed away from the product. Many polar organic solvents may be used but methyl alcohol is the solvent found to be most suitable. Washing of product to dissolve out free urea may be advantageously used also with the processes described in our published U.K. patent specification Nos. 1,118,215; 1,168,092 and 1,206,195.

The re-grinding may, if desired, be performed between the stages (i) and (ii) above and the product washed with methanol prior to the drying stage.

The invention is illustrated but in no way limited by the following examples:

EXAMPLE 1

Several batches of a 1:1.1 moles mixture of potassium bicarbonate and urea were placed in open trays and heated in an oven. Steam was passed into the oven to maintain a high humidity, the rate of steam was lower during the first stage, the reaction stage and was increased for the second stage, the steaming stage. The temperature, the times and steam input rates for each stage of the reaction are shown in Table 1 for each batch of reactant.

An analysis of the final product of each batch after drying was made, and it was found to consist of a high concentration of the compound $KC_2N_2H_3O_3$ having an infrared spectrum identical with that shown for such a compound in our U.K. Pat. No. 1,168,092. The concentration of excess urea was determined by dissolving it out in methanol.

Results are shown in Table 1 for the concentrations of urea and the fire-extinguishing compound $KC_2N_2H_3O_3$.

EXAMPLE 2

Experiments were conducted as for Example 1 but designed to react all the urea and give low concentrations of excess urea. The results are shown in Table 2. In this table ND means none detected by the method of analysis used.

TABLE 1

| | | Time of reaction in hours | | | Rate of steam input, kg./hour | | Analysis of product | |
|---|---|---|---|---|---|---|---|---|
| | Temp., °C. | 1st stage | 2d stage | Total[1] | 1st stage | 2d stage | Percent urea by weight | Percent $KC_2N_2H_3O_3$ by weight |
| Batch number: | | | | | | | | |
| 1 | 150 | 2.75 | 0.5 | 3.5 | 14.25 | 17.75 | 1.85 | 84 |
| 2 | 150 | 2.75 | 0.5 | 3.5 | 12.5 | 16.0 | 1.15 | 85 |
| 3 | 150 | 2.25 | 1.0 | 3.5 | 12.5 | 16.0 | 2.4 | 74 |
| 4 | 150 | 2.75 | 1.0 | 4.0 | 12.5 | 16.0 | 0.25 | 86 |
| 5 | 150 | 3.0 | 1.0 | 4.25 | 14.25 | 17.75 | 1.5 | 83 |
| 6 | 150 | 2.75 | 1.5 | 4.5 | 12.5 | 16.0 | 0.1 | 86 |
| 7 | 150 | 3.25 | 1.0 | 4.5 | 12.5 | 14.25 | 0.05 | 79 |
| 8 | 160 | 2.5 | 1.0 | 3.75 | 14.25 | 17.75 | 0.1 | 81 |
| 9 | 160 | 2.75 | 1.0 | 4.0 | 14.25 | 17.75 | <0.05 | 79 |

[1] The total time of reaction includes in each case a 15 minute drying stage.

TABLE 2

| | | Time of reaction in hours | | | Rate of steam input, kg./hour | | Analysis of product | |
|---|---|---|---|---|---|---|---|---|
| | Temp., °C. | 1st stage | 2d stage | Total[1] | 1st stage | 2d stage | Percent urea by weight | Percent $KC_2N_2H_3O_3$ by weight |
| Batch number: | | | | | | | | |
| 1 | 150 | 3.25 | 2.0 | 5.50 | 8.75 | 12.25 | 0.45 | 81 |
| 2 | 150 | 2.75 | 2.0 | 5.0 | 12.25 | 15.75 | ND | 75 |
| 3 | 150 | 2.75 | 1.5 | 4.50 | 12.25 | 15.75 | 0.20 | 90 |
| 4 | 160 | 2.5 | 1.25 | 4.0 | 15.75 | 19.25 | 0.1 | 80 |
| 5 | 160 | 2.5 | 1.25 | 4.0 | 15.75 | 19.25 | 0.1 | 83 |
| 6 | 160 | 3.25 | 2.0 | 5.5 | 8.75 | 12.25 | ND | 80 |
| 7 | 160 | 3.25 | 2.0 | 5.5 | 12.25 | 12.25 | ND | 82 |
| 8 | 165 | 3.0 | 1.25 | 4.5 | 12.25 | 15.75 | ND | 81 |
| 9 | 165 | 3.0 | 1.25 | 4.5 | 12.25 | 15.75 | ND | 86 |
| 10 | 165 | 3.0 | 1.25 | 4.5 | 12.25 | 15.75 | ND | 85 |

See Table 1 for footnote 1.

What we claim is:

1. A method of producing fire-extinguishing compositions comprising reacting urea with an alkali metal hydroxide, carbonate, bicarbonate or sesquicarbonate at a temperature of 150° C. to 200° C. and in contact with an atmosphere containing at least 5% and up to 50% by volume of water vapour and maintaining the said conditions until the compound $MC_2N_2H_3O_3$ is formed.

2. A method as claimed in claim 1 wherein the reaction is carried out in three consecutive stages in which water is a product of reaction in a first reaction stage, the humidity of the said atmosphere is increased to 10% to 30% by volume by adding steam in a second steaming stage and the steam is discontinued and the product is dried in a third drying stage.

3. A method as claimed in claim 2 wherein the product of one stage is agitated sufficiently to bring fresh surfaces of solid into contact with the atmosphere treatment prior to treatment in a subsequent stage.

4. A method as claimed in claim 2 wherein the product is agitated or ground at least part of the time during the second steaming stage or the steaming stage is interrupted for accomplishing said agitating or grinding of the product.

5. A method as claimed in claim 2 wherein a flow of dry air is provided for the atmosphere over the reactants in the third stage.

6. A method as claimed in claim 1 wherein the carbonic acid salt is a bicarbonate.

7. A method as claimed in either claim 1 wherein the alkali metal is potassium.

8. A method as claimed in claim 1 wherein the temperature of the reaction is from 150° C. to 180° C.

9. A method as claimed in claim 8 wherein the temperature is from 150° C. to 165° C.

10. A method as claimed in claim 1 wherein the atmosphere in contact with the reactants contains from 10% to 30% by volume of water vapour.

11. A method as claimed in claim 1 wherein the reaction is conducted in a substantially closed vessel to which a controlled amount of steam is admitted.

References Cited

UNITED STATES PATENTS

| 1,915,425 | 6/1933 | Kloepfer | 423—354 |
| 2,690,956 | 10/1954 | Ter Horst | 423—365 |
| 2,801,154 | 7/1957 | De Pree et al. | 423—365 |
| 3,497,315 | 2/1970 | Pratt | 423—365 |
| 3,607,744 | 9/1971 | Cottrell | 252—2 X |
| 3,608,641 | 9/1971 | Cottrell | 252—2 X |
| 3,536,620 | 10/1970 | Birchall | 252—2 X |
| 2,063,772 | 12/1936 | Thomas et al. | 252—2 X |
| 3,484,372 | 12/1969 | Birchall | 252—2 X |
| 3,642,621 | 2/1972 | Hollows | 260—553 X |

CHARLES E. VAN HORN, Primary Examiner

U.S. Cl. X.R.

106—15 FP; 252—2; 260—553 R; 423—365